United States Patent [19]

Petrow

[11] 3,776,776

[45] Dec. 4, 1973

[54] GOLD-COATED PLATINUM-METAL BLACK CATALYTIC STRUCTURE AND METHOD OF PREPARATION

[75] Inventor: Henry G. Petrow, Cambridge, Mass.

[73] Assignee: Prototech Company, Burlington, Mass.

[22] Filed: Jan. 21, 1972

[21] Appl. No.: 219,882

[52] U.S. Cl. ...... 136/86 E, 29/192 CP, 117/100 M, 117/227, 136/120 FC
[51] Int. Cl. .......................................... H01m 27/04
[58] Field of Search .................. 136/120 R, 120 FC, 136/86 E; 117/227, 100 M; 75/.5 A; 29/192 CP; 252/474

[56] References Cited
UNITED STATES PATENTS

| | | | |
|---|---|---|---|
| 3,282,737 | 11/1966 | Hintermann et al. | 136/120 FC |
| 3,011,920 | 12/1961 | Shipley, Jr. | 117/227 X |
| 3,239,382 | 3/1966 | Thompson | 136/120 FC |
| 3,309,231 | 3/1967 | Hess | 136/120 FC X |
| 3,427,153 | 2/1969 | Venkatesan et al. | 136/120 FC |

*Primary Examiner*—L. Dewayne Rutledge
*Assistant Examiner*—M. J. Andrews
*Attorney*—Rines & Rines

[57] ABSTRACT

This disclosure is concerned with a novel gold-coated platinum-metal black catalytic structure, such as a fuel cell electrode and the like, formed by growing colloidal gold oxide upon the black and reducing the same.

8 Claims, No Drawings

GOLD-COATED PLATINUM-METAL BLACK CATALYTIC STRUCTURE AND METHOD OF PREPARATION

The present invention relates to catalytic structures and methods involving the coating of platinum-metal blacks with adherent high surface area gold particulate coatings.

For some time it has been considered highly advantageous to protect high surface area platinum-metal blacks (where this term is particularly intended herein to embrace platinum, rhodium, ruthenium, irridium and osmium), from corrosive attack by media in which they are employed for catalytic and similar purposes. In aqueous KOH electrolyte fuel cells, for example, platinum black air or oxidant cathode electrodes suffer corrosive deterioration with operational use. Attempts to take advantage of what had been thought to be the less corrosive properties of gold have not proven out. Gold blacks, for example, formed into such cathode electrodes and so operated, have been found not to achieve the high surface area and catalytic activity of, for example, the platinum black. While deposits of gold upon platinum black and similar substrate have been tried, relatively low surface area gold coatings have been produced as compared with 25-40 meters $^2$/gram of the high surface area platinum black.

An object of the present invention, accordingly, is to provide a new and novel gold-adsorbed platinum-metal black catalytic structure of high surface area.

Other and further objects are explained hereinafter, being more particularly delineated in the appended claims. In summary, however, the invention involves the discovery that growing colloidal gold oxide upon nuclei of the platinum-metal black and then reducing the oxide coatings can startingly achieve the desired end.

While the invention will be described for illustrative purposes in connection with the preferred platinum black and an important application thereof to electrochemical cell catalytic cathodes, it is, of course, to be understood that the structure and method of the invention are clearly of broader applicability whereever their advantages may be desired, and that similar blacks of the platinum metal family may also be employed.

As before stated, it has been discovered that normally non-adsorptive gold oxide colloids can be caused to achieve tenacious adsorption upon the platinum particles of platinum black, for example, by actually growing the colloidal sol particles upon the metal particles of the black as nuclei, rather than just trying to react a black substrate with a colloidal sol.

As an example, chloroauric acid ($HA\mu Cl_4$), sufficient to contain about four grams of gold, may be dissolved in about 900cc. of water to which NaOH is added in an equivalent amount such that 4 moles of $OH^-$ are provided for each mole of gold; in this instance, 81.2 milliliters of 1 molar NaOH. To this solution and mixture, five grams of platinum black of nominal surface area about 25 meters$^2$/gram may be added and the resulting particulate gold oxide colloid sol may be produced under temperature maintained at about 35° – 45°C for about 24 hours. Under such circumstances, it has been found that the gold oxide grows upon the platinum metal of the black as nuclei, as it is formed. By filtering out the gold-oxide coated platinum particles of the black from the colloid-forming solution and then reducing the oxide to metallic gold with aqueous hydrazine, a strongly adherent adsorbed gold coating upon all of the platinum particles of the platinum black is achieved that has substantially the high surface area of the original platinum black.

With such a product formed into a cathode electrode and operated with air or other oxidant in the beforementioned KOH fuel cells, for example, the adsorbed gold contacts the KOH electrolyte rendering the cathode non-corrosive; and yet, unlike prior gold-deposited cathodes, maintains substantially the high surface area and resulting catalytic activity of the platinum black substrate.

In such an aqueous fuel cell with 40% KOH electrolyte, for example, operated at about 180°F with about 200 amperes per square foot at about 0.9 volt, and with a two-inch square hydrogen anode and a similarly dimensioned oxygen gold-adsorbed platinum black cathode, as before described, with about 25 percent gold content, no decay in performance was observed for over 150 hours of operation; whereas, prior art the same conditions of operation, but with a priorart cathode having an equivalent amount of gold, as in an unsupported gold black cathode structure, decays of as much as 20–30 millivolts have been observed.

Further modifications and uses of this catalytic structure will occur to those skilled in this art, and all such are considered to fall within the spirit and scope of the invention as defined in the appended claims.

What is claimed is:

1. A method of adsorbing gold upon a high surface area platinum-metal black, that comprises, mixing particulate platinum-metal black into a solution, providing in the solution colloidal gold oxide and growing colloidal gold oxide particles upon the metal particles of the black acting as nuclei, heating the mixture to enable such growth and the resulting adsorption of gold oxide coatings upon the platinum-metal nuclei of said black, filtering out the gold oxide-adsorbed platinum-metal black, and reducing the gold oxide to produce gold metal coatings adsorbed upon the said platinum metal particles of the said black.

2. A method as claimed in claim 1 and in which, the colloidal gold oxide is provided in a sol by adding NaOH to a solution of chloroauric acid in an amount such that substantially four moles of $OH^-$ are provided for each mole of gold.

3. A method as claimed in claim 1 and in which the gold-adsorbed black material is formed into an electrode and employed as a cathode with oxidant in a KOH electrolyte fuel cell.

4. A method as claimed in claim 1 and in which the platinum metal is selected from the group consisting of platinum, rhodium, ruthenium, irridium and osmium.

5. A catalytic structure comprising a high surface area platinum-metal black the metal particles of which are coated with gold that has been reduced from colloidal gold oxide grown upon the black and adsorbed to the nuclei provided by the metal particles thereof in accordance with the method of claim 1.

6. A catalytic structure as claimed in claim 5 and in which said platinum metal is selected from the group consisting of platinum, rhodium, ruthenium, irridium and osmium.

7. A catalytic structure as claimed in claim 5 and in which the said black is of surface area of the order of substantially 25-50 meters$^2$/gram and the adsorbed gold content is of the order of substantially 25 percent.

8. A catalytic structure as claimed in claim 5 composited into cathode electrode form for use with oxidant in a KOH electrochemical cell and the like.

* * * * *